United States Patent [19]

Fujimoto

[11] Patent Number: 5,213,081
[45] Date of Patent: May 25, 1993

[54] MISFIRE SENSING APPARATUS FOR AN INTERNAL COMBUSTION ENGINE

[75] Inventor: Takanori Fujimoto, Himeji, Japan

[73] Assignee: Mitsubishi Denki Kabushiki Kaisha, Tokyo, Japan

[21] Appl. No.: 949,126

[22] Filed: Sep. 23, 1992

[30] Foreign Application Priority Data

Sep. 27, 1991 [JP] Japan .................. 3-249038

[51] Int. Cl.[5] .................. F02D 41/04; F02D 41/22; F02P 5/15
[52] U.S. Cl. .................. 123/419; 123/436; 123/479; 123/481
[58] Field of Search ............... 123/419, 436, 479, 481

[56] References Cited

U.S. PATENT DOCUMENTS

| | | | |
|---|---|---|---|
| 4,366,793 | 1/1983 | Coles ...................... | 123/436 |
| 4,366,794 | 1/1983 | Hachiga et al. .......... | 123/479 |
| 4,862,853 | 9/1989 | Tsukamoto et al. ...... | 123/419 X |
| 4,909,223 | 3/1990 | Ituzi et al. .............. | 123/481 |
| 4,930,479 | 6/1990 | Osawa et al. ............ | 123/436 |
| 4,930,481 | 6/1990 | Fujimoto et al. ......... | 123/481 |
| 4,932,379 | 6/1990 | Tang et al. .............. | 123/436 |
| 5,035,220 | 7/1991 | Uchinami et al. ........ | 123/436 |
| 5,050,554 | 9/1991 | Ichikawa .................. | 123/419 |

Primary Examiner—Willis R. Wolfe
Attorney, Agent, or Firm—Sughrue, Mion, Zinn, Macpeak and Seas

[57] ABSTRACT

A misfire sensing apparatus for an internal combustion engine can determine an occurrence of misfiring in any of engine cylinders as well as which cylinder is misfiring with improved accuracy and reliability. A crank angle sensor 11 generates an output signal at predetermined crank angles of the engine. A control unit 20 identifies operating states of the cylinders based on the output signal from the crank angle sensor. It successively senses misfire information in the form of the number of revolutions per minute of the engine at the predetermined crank angles, and determines possible misfiring in a cylinder when a difference between the current misfire information and the previous one is greater than a predetermined level. When there is possible misfiring in a cylinder, the control unit adjusts an engine operating parameter by a predetermined value, compares misfiring information as sensed before and after the adjustment, and determines an occurrence of true misfiring if a difference in the misfiring information before and after the adjustment is less than a predetermined reference value. In one form, the control unit decreases, upon occurrence of possible misfiring in a cylinder, an amount of fuel supplied to that cylinder so as to cause intentional misfiring therein. In another form, the control unit stops, upon occurrence of possible misfiring in a cylinder, firing of a spark plug for that cylinder.

5 Claims, 5 Drawing Sheets

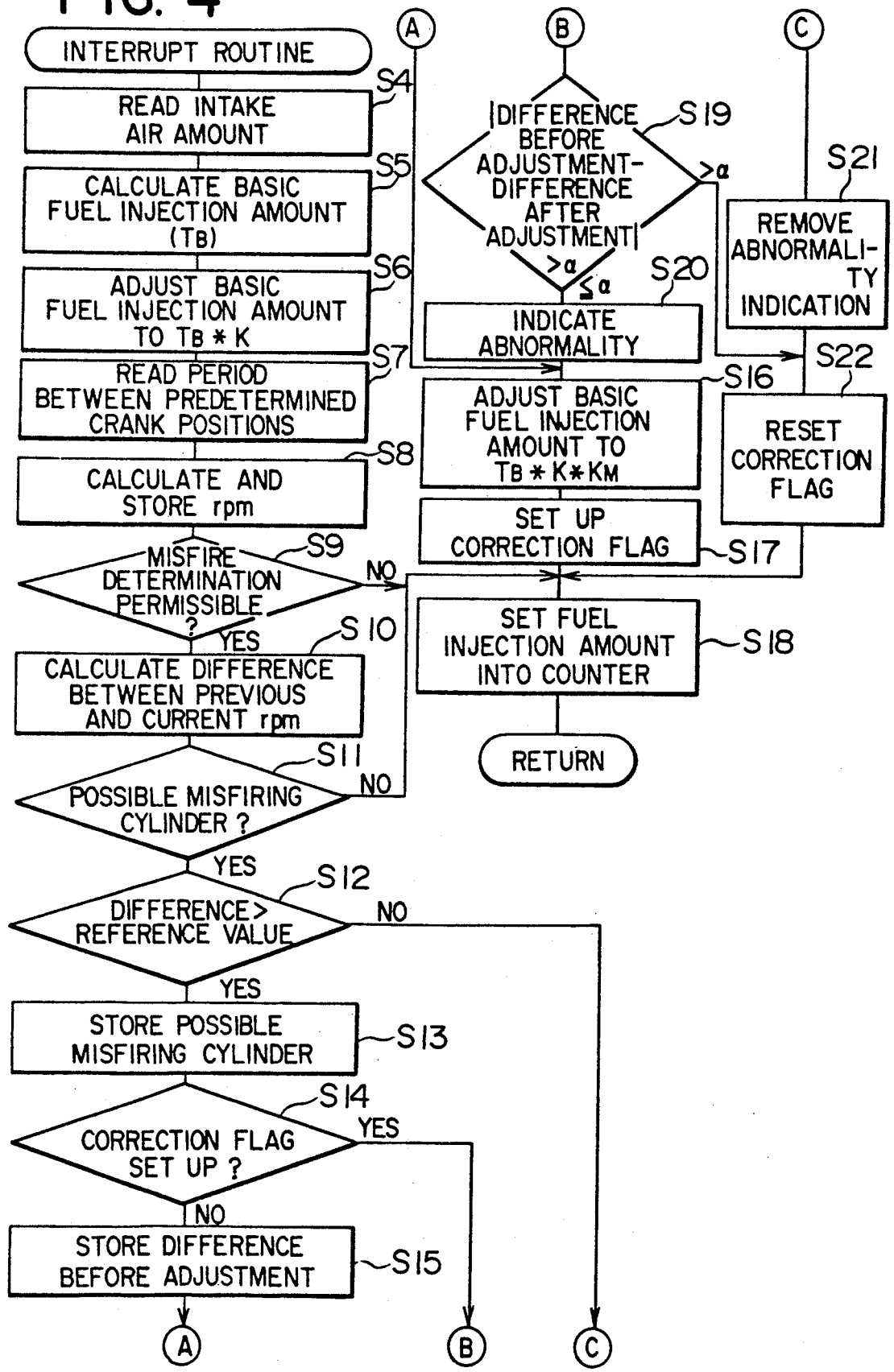

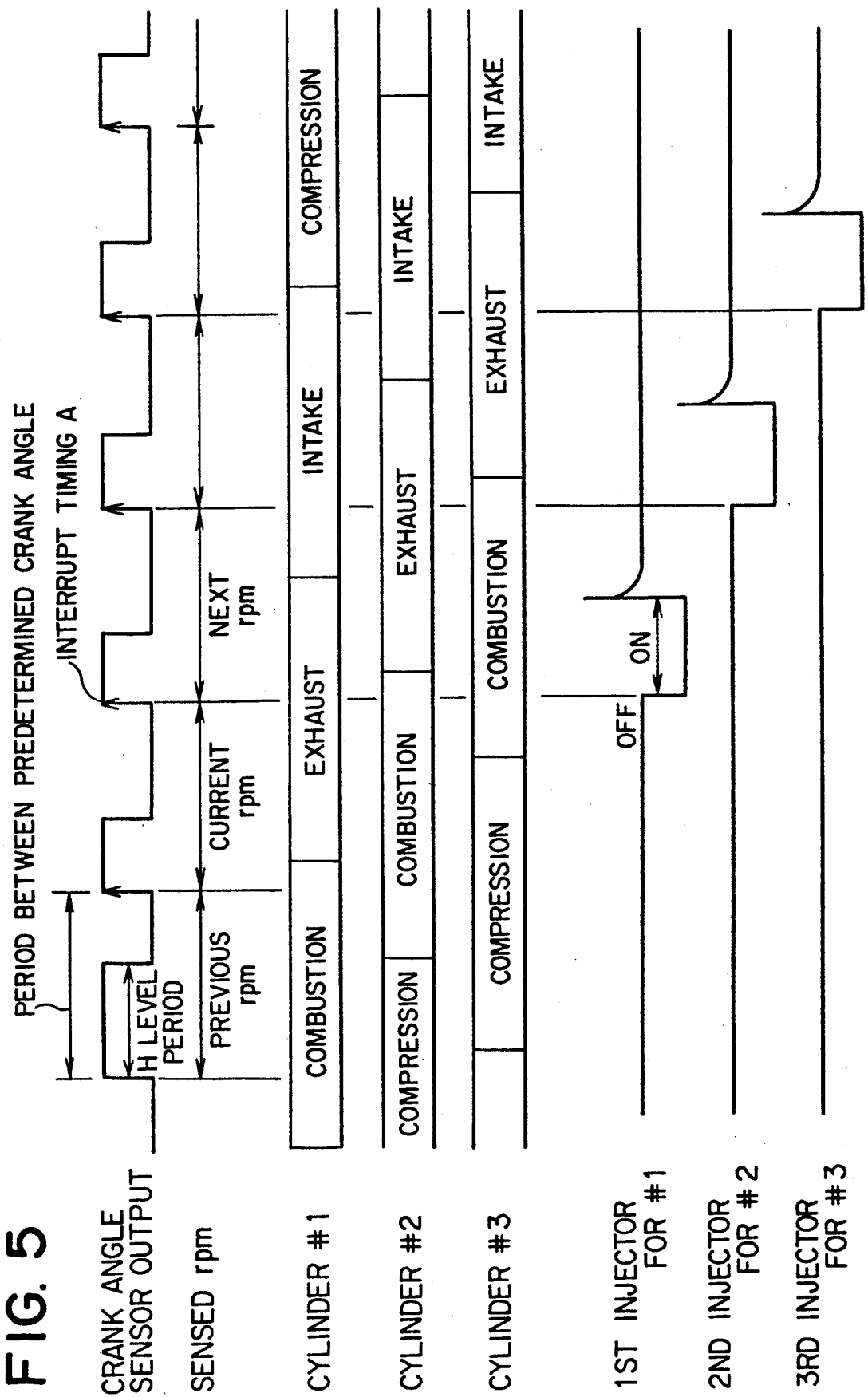

MISFIRE SENSING APPARATUS FOR AN INTERNAL COMBUSTION ENGINE

BACKGROUND OF THE INVENTION

The present invention relates to a misfire sensing apparatus for an internal combustion engine, and more particularly, it relates to such a misfire sensing apparatus which is capable of sensing misfiring in any of cylinders of the engine as well as determining which cylinder is misfiring with improved accuracy.

Japanese Patent Laid-Open No. 62-118031 discloses a misfire sensing apparatus for an internal combustion engine in which the period of successive pulses per unit crank angle is measured, and a peak value of variations in the rotational speed of the engine is determined based on the pulse width of each pulse so that the time from a reference crank angle to the peak value is compared with a reference time which the peak value takes from the reference crank angle in the normal operation of the engine without misfiring, and an occurrence of misfiring as well as which cylinder such misfiring has taken place are determined based on the result of this comparison.

With such misfire and misfiring-cylinder determinations carried out by the conventional misfire sensing apparatus, however, variations in the rotational speed of the engine used for these determinations are subject to a significant change due to various factors other than misfiring such as, for example, influences from an engine drive system at the time when the vehicle is travelling on a bad road or the like. For this reason, too high sensitivity in misfire determination leads to an error or inaccurate result. On the other hand, if the sensitivity is low, it will become impossible to perform misfire determination with an acceptable level of accuracy at all times. That is, because of certain operating conditions of the engine, no misfiring can be determined in spite of the fact that a cylinder is actually misfiring.

SUMMARY OF THE INVENTION

Accordingly, the present invention is intended to overcome the above-described problems of the conventional misfire sensing apparatus, and has for its object the provision of a novel and improved misfire sensing apparatus for an internal combustion engine which is able to determine whether there is misfiring in any of engine cylinders as well as which cylinder is misfiring with improved accuracy and reliability.

In order to achieve the above object, according to the present invention, there is provided a misfire sensing apparatus for an internal combustion engine which comprises: a crank angle sensor for generating an output signal at predetermined crank angles of a crankshaft of the engine; cylinder identifying means for identifying operating states of a plurality of cylinders of the engine based on the output signal from the crank angle sensor; adjusting means for adjusting an engine operating parameter so as to control the respective operations of the cylinders; misfire sensing means for sensing misfire information relating to misfiring in each of the cylinders and determining possible misfiring in a cylinder based on the misfire information, the misfire sensing means being operable such that when there is possible misfiring in a cylinder, it controls the adjusting means so as to adjust the engine operating parameter by a predetermined value, compares misfiring information as sensed before and after the adjustment, and determines an occurrence of true misfiring if a difference in the misfiring information before and after the adjustment is less than a predetermined reference value.

The misfire sensing means successively senses misfire information at the predetermined crank angles of the crankshaft, and determines possible misfiring in a cylinder when a difference between the current misfire information and the previous one is greater than a predetermined level.

Preferably, the misfire information is the number of revolutions per minute of the engine.

In one form of the invention, the adjusting means comprises a plurality of fuel injectors one for each cylinder, and the engine operating parameter is an amount of fuel supplied to each cylinder from a corresponding one of the fuel injectors, the misfire sensing means being operable to decrease, upon occurrence of possible misfiring in a cylinder, an amount of fuel supplied to that cylinder so as to cause intentional misfiring therein.

In another form of the invention, the adjusting means comprises a plurality of spark plugs one for each cylinder, and the engine operating parameter is firing of the spark plugs, the misfire sensing means being operable to stop, upon occurrence of possible misfiring in a cylinder, firing of a spark plug for that cylinder.

The above and other objects, features and advantages of the invention will become more readily apparent from the following detailed description of a preferred embodiment of the invention taken in conjunction with the accompanying drawings.

BRIEF DESCRIPTION OF THE DRAWINGS

FIG. 4 is a flow chart of an interrupt routine showing detailed steps for misfire determination carried out by the apparatus of FIGS. 1 and 2; and FIG. 5 is a diagrammatic view showing various timings in operation of the apparatus of FIGS. 1 and 2.

DESCRIPTION OF THE PREFERRED EMBODIMENTS

Preferred embodiments of the invention will now be described in detail with reference to the accompanying drawings.

Figure 1:
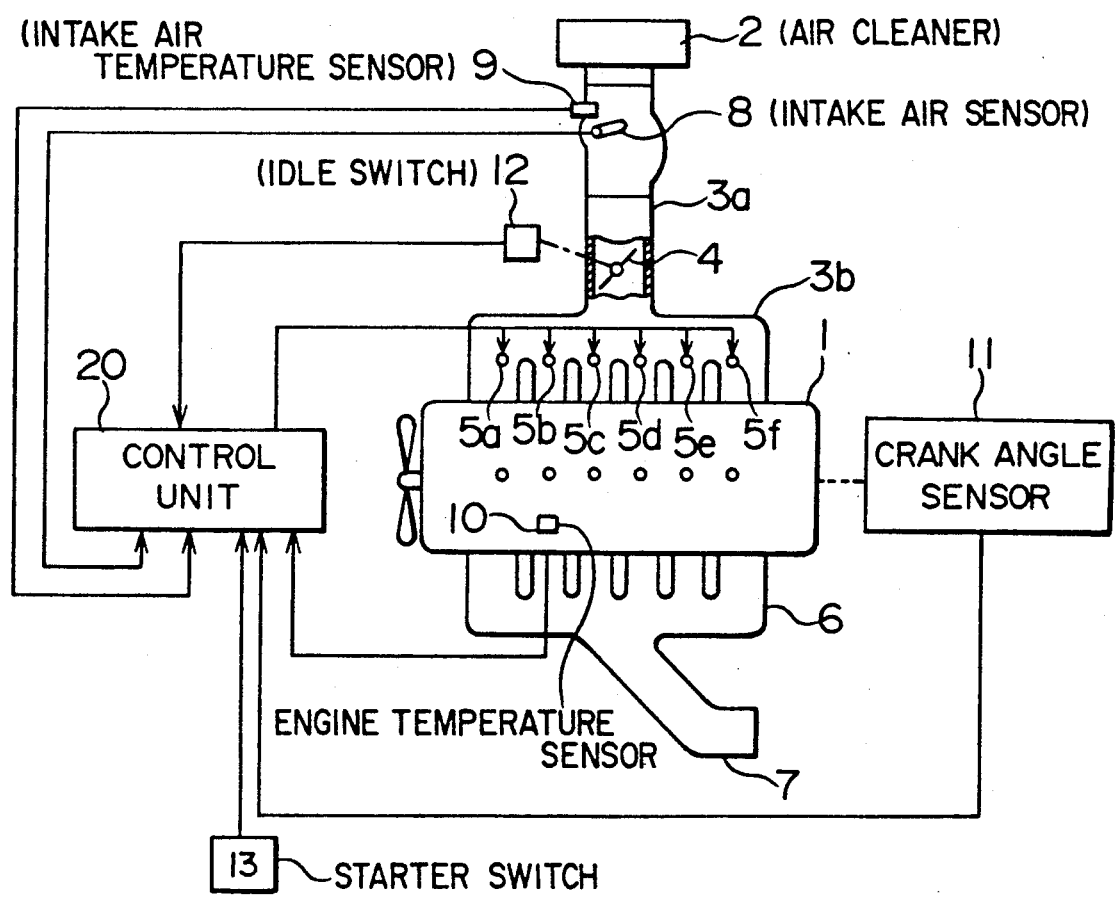
FIG. 1 is a schematic view showing the general arrangement of an internal combustion engine equipped with a misfire sensing apparatus in accordance with the invention.

Referring to the drawings and first to FIG. 1, there is illustrated an internal combustion engine equipped with a misfire sensing apparatus constructed in accordance with principles of the invention. In the illustrated embodiment, the present invention is applied to a four-cycle spark ignition engine with six cylinders which is adapted to be installed on a motor vehicle. An air cleaner 2 is attached to an end of an intake pipe 3a which is connected with an end of an intake manifold 3b which is in turn connected at the other end thereof with an engine proper 1. A throttle valve 4 is disposed in the intake pipe 3a for adjusting an amount of intake air sucked from the ambient atmosphere into the cylinders of the engine proper 1 through the air cleaner 2, the intake pipe 3a and the intake manifold 3b. A plurality of fuel injectors 5a through 5f in the form of electromagnetic injection valves are mounted on the intake manifold 3b for injecting fuel to corresponding cylinders. In one aspect, the fuel injectors 5a through 5f constitute adjusting means for adjusting an engine operating parameter so as to control the respective operations of said cylinders. An exhaust manifold 6 is connected at one end thereof with the cylinders and at the other end thereof with an exhaust pipe 7 for discharging exhaust gases from the cylinders to the ambient atmosphere. An intake air sensor 8 is mounted on the intake pipe 3a for sensing an amount of intake air sucked into the engine cylinders and generating a corresponding output signal in the form of an analog voltage. An intake air temperature sensor 9 is mounted on the intake pipe 3a for sensing the temperature of intake air supplied to the cylinders through the intake pipe 3a and the intake manifold 3b and generating a corresponding output signal in the form of an analog voltage. An engine temperature sensor 10 is mounted on the engine proper 1 for sensing the temperature of an engine coolant and generating a corresponding output signal in the form of an analog signal representative of the engine temperature. A crank angle sensor 11 is mounted on an unillustrated crankshaft of the engine for generating a pulse signal at predetermined crank angles of the crankshaft in synchronization with the rotation thereof, the pulse signal having a frequency corresponding to the rotational speed or the number of revolutions per minute (rpm) of the crankshaft. For example, in order to serve for cylinder identification, the pulse signal contains a cylinder identification pulse corresponding to a specific cylinder per revolution of the crankshaft, the cylinder identification pulse having a pulse width different from that of other pulses corresponding the remaining cylinders. An idle switch 12 is associated with the throttle vale 4 so that it is operated or turned on when the opening of the throttle valve 4 is less than a predetermined opening degree, for generating an output signal representative of an idling operation of the engine. A starter switch 13 serves to turn an unillustrated starter motor on and off and generate an output signal A when it turns the starter motor on. A control unit 20 receives the output signals from the various sensors 8 through 11 and the idle and starter switches 12, 13, calculates, based upon these signals, an appropriate amount of fuel to be injected from the fuel injectors 5a through 5f, and controls the operating time for each fuel injector during which the corresponding fuel injector is operated to perform fuel injection so as to adjust the amount of fuel supplied to the corresponding cylinder. The control unit 20 includes a cylinder identifying means and a misfire sensing means, as will be described later in detail.

Figure 2:
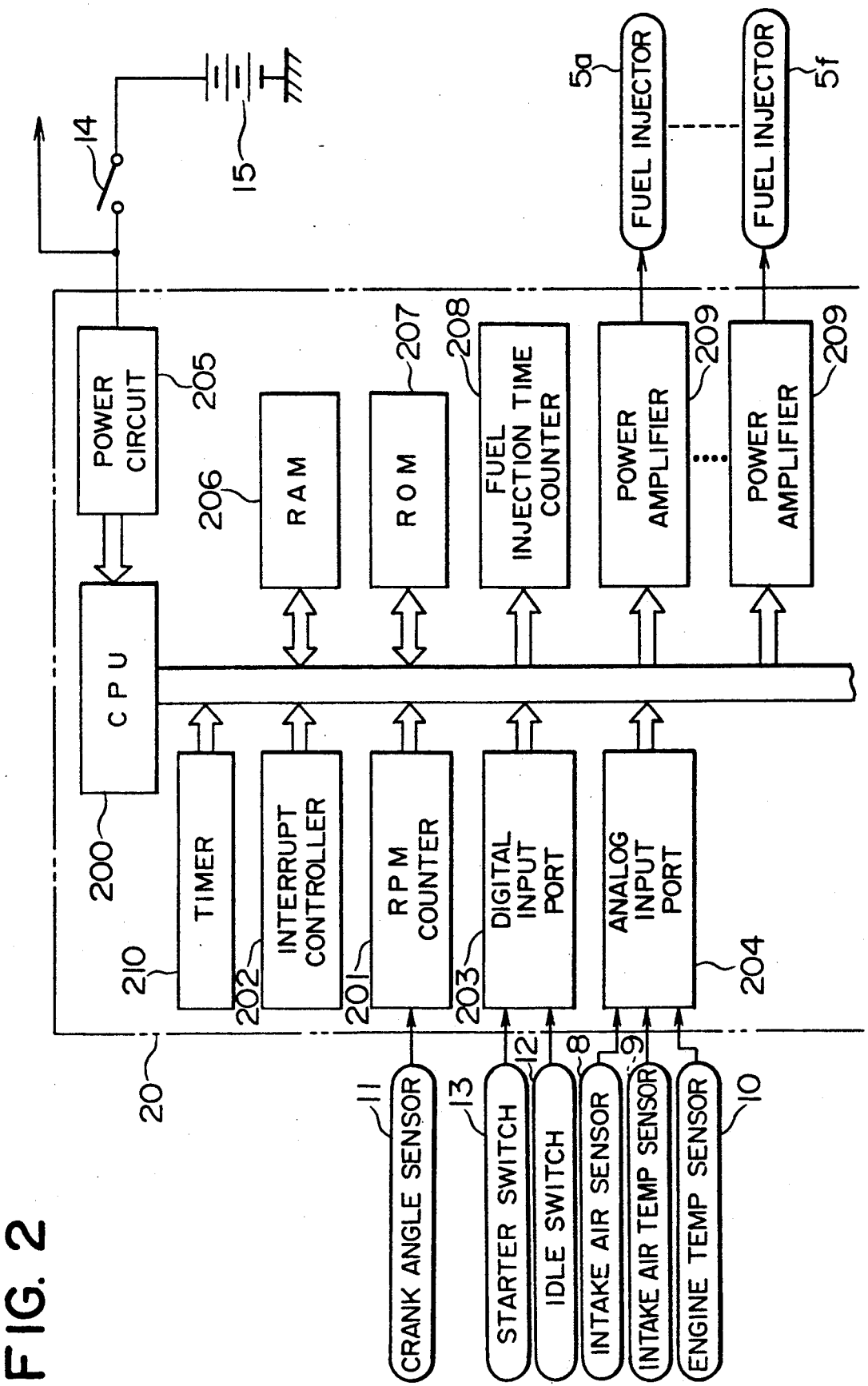
FIG. 2 is a schematic block diagram showing major parts of the misfire sensing apparatus of FIG. 1.

FIG. 2 illustrates in block form the detailed construction of the control unit 20. In this figure, a central processing unit (hereinafter simply referred to as a CPU) 200 calculates amounts of fuel injected from the fuel injectors 5a through 5f into the respective cylinders, identifies the operating states of the cylinders, and perform misfiring determination and the like. A rotational number counter 201 measures, based on the output signal from the crank angle sensor 11, the period between predetermined crank angles of the crankshaft, and generates a corresponding output signal upon termination of each measurement. An interrupt controller 202 is responsive to an output signal from the counter 201 to generate an interrupt signal which is sent to the CPU 200 via a common bus 212 to execute an interrupt routine for performing calculations of fuel injection amounts and the like. A digital input port 203 serves to transmit digital signals such as a starter signal from the starter switch 13, an idle signal from the idle switch 12 and the like, to the CPU 200 via the common bus 212. An analog input port 204 comprising, though not shown, an analog multiplexer and an analog/digital (A/D) converter serves to convert output signals from the intake air sensor 8, the intake air temperature sensor 9 and the engine temperature sensor 10 from analog into digital form, which are then transmitted to the CPU 200 via the common bus 212. The CPU 200 is connected to a battery 15 through a power circuit 205 and a key switch 14 so that it is energized by the battery 15 through the power circuit 205 upon closure of the key switch 14. Connected via the common bus 212 to the CPU 200 are a random access memory (RAM) 206 for temporarily storing data calculated by the CPU 200, a read only memory (ROM) 207 for storing programs executed by the CPU 200 as well as various information such as constant or reference values and the like to be used in calculations carried out by the CPU 200, a fuel injection time counter 208 in the form of a down counter incorporating a register therein for converting digital signals representative of opening or operating times and hence fuel injection amounts of the respective fuel injectors 5a through 5f calculated by the CPU 200 into pulse signals having pulse widths corresponding to the actual opening or operating times of the fuel injectors 5a through 5f. A plurality of power amplifiers 209 corresponding in number to the fuel injectors 5a through 5f are connected to the CPU 200 via the common bus 212 for amplifying output signals from the CPU 200 and supplying amplified outputs to the respective fuel injectors 51 through 5f. A timer 210 measures a length of elapsed time and supplies it to the CPU 200 via the common bus 212.

Figure 3:
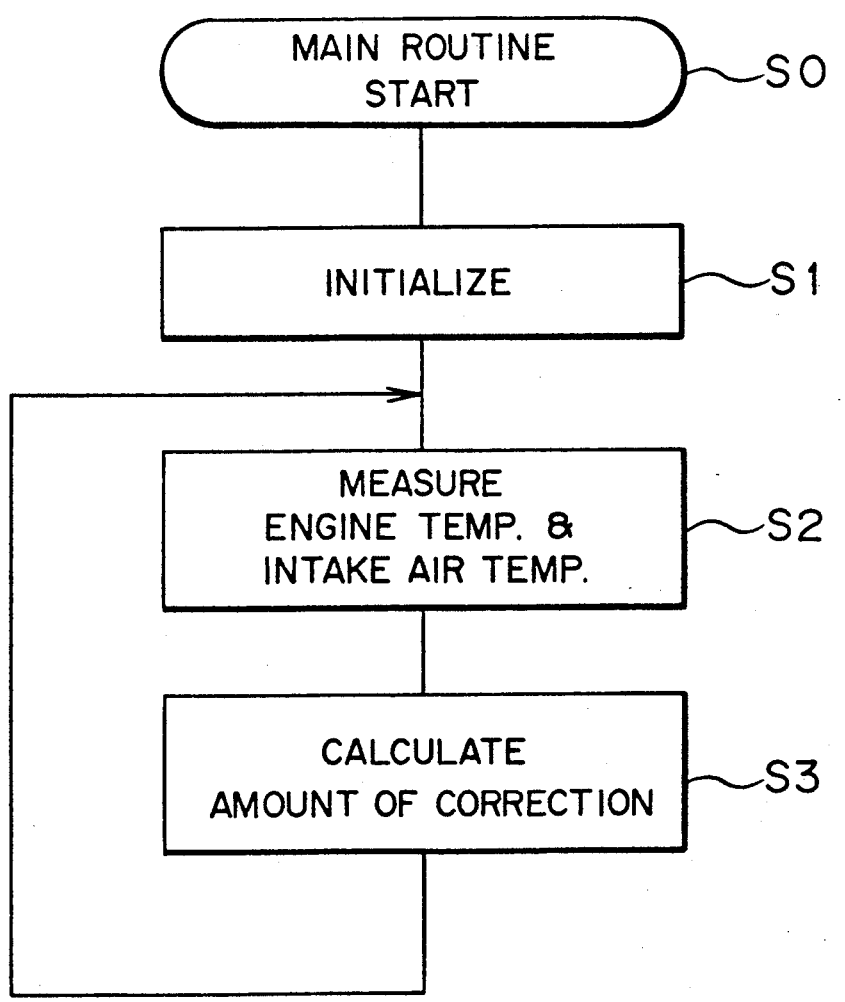
FIG. 3 is a flow chart of a main routine showing the operation of the apparatus of FIG. 1.

The operation of the above embodiment shown in FIGS. 1 and 2 will be described in detail while referring to FIGS. 3 through 5.

First, the operation or function of the CPU 200 in relation to the overall operation of the apparatus will schematically be described below with particular reference to FIG. 3. When the key switch 14 and the starter switch 13 are both turned on to start the engine, processing of the main routine starts in Step S0. In Step S1, initialization is performed, and in Step S1, the CPU 200 reads in an output signal from the engine temperature sensor 10 representative of the engine temperature via the analog input port 204. In Step S3, the CPU 200 calculates, based on the result of the calculation performed in Step S2, an amount of fuel correction or adjustment which is then stored in the RAM 206. Thereafter, the control process returns to Step S2, and processing in Steps S2 and S3 are repeatedly carried out. If, however, an interrupt signal from the interrupt controller 202 is input to the CPU 200 via the bus 212, processing of the main routine is immediately interrupted, and an interrupt routine is executed by the CPU 200.

The interrupt routine will be described below in detail with particular reference to FIG. 4. First in Step S4, the CPU 200 reads in via the analog input port 204 an output signal from the intake air sensor 8 representative of the amount of intake air sucked into the engine proper 1. Then in Step S5, it calculates a basic amount of injection fuel $T_B$ on the basis of the rotational speed or the number of revolutions per minute (rpm) of the engine and the amount of intake air. In Step S6, the CPU 200 reads out the amount of fuel correction or adjustment K calculated in the main routine from the RAM 206, and corrects or adjusts, based on the fuel correction amount K, the amount of injection fuel or the time duration of fuel injection which determines the air/fuel ratio of a mixture supplied to the engine cylinders. In Step S7, the CPU 200 reads in a period P between the predetermined crank angles measured by the engine speed counter 201. In this embodiment, for instance, the predetermined crank angles are set at every 120°. In Step S8, based on the period P, the number of revolutions per minute N (rpm) of the engine, which is one example of misfire information, is calculated using the following equation:

$$N = C/P$$

where C is a constant. The engine rpm N thus calculated is then stored in the RAM 206. Then in Step S9, a check is carried out as to whether the operation of the engine permits misfire determination. In this respect, misfire determination can be done only when the engine is in a steady state operation or in an idling operation. To this end, checks are done on the output signal of a steady-state sensing means which determines, based on the rate of change of the intake air amount, whether the engine is in an accelerating state, and which generates an output signal during engine acceleration, and on the output signal from an idle state sensing means which determines whether the engine is in an idling operation, on the basis of an output signal from the idle switch 12, an output signal from an unillustrated neutral switch representative of a neutral condition of a transmission of the vehicle, and an output signal from an unillustrated vehicle speed sensor representative of the vehicle speed at which the vehicle is travelling.

If it is determined in Step S9 that the engine is in a misfire determination permissible condition, the program goes to Step S10, whereas if otherwise, it goes to Step S18. In Step S10, a difference or an amount of change between the previous engine rpm, which was stored in the RAM 206 in Step S8 of the previous interrupt routine, and the current engine rpm is calculated. Subsequently in Step S11, it is determined whether misfire determination can be made on a current cylinder. If not, the control process goes to Step S18, but if otherwise, it goes to Step S12 wherein a comparison is made between the amount of change in the engine rpm obtained in Step S10 and a predetermined reference value. If the amount of change in the engine rpm is greater than the predetermined reference value, there is a doubt or possibility that the cylinder on which misfire determination is made can be misfiring, and then in Step S13, such a doubtful or possible misfire information is stored in the RAM 206.

Here, the above Steps S10 through S12 will be detailed while referring to the relation between the output signal of the crank angle sensor 11 and the calculated engine rpm, as illustrated in FIG. 5. For example, at an interrupt timing A, the amount of change in the engine rpm (i.e., the difference between the current rpm and the previous rpm) is compared with a predetermined reference value to determine whether the former is greater or less than the latter. Here, let us suppose that doubtful or possible misfiring takes place in cylinder #2, for instance. At this time, the engine generates no output torque so that the current engine rpm significantly decreases from the previous engine rpm with the result that the difference therebetween exceeds the predetermined reference value. In this connection, it is to be noted that if the crank angle sensor 11 is constructed such that it generates an output pulse of a high level for a specific cylinder #1 having a pulse width greater than those of the other output pulses corresponding to the remaining cylinders #2 through #6, as illustrated in FIG. 5, it is possible to identify, based on the specific cylinder #1, the cylinder which is determined to be misfiring in the interrupt routine. In addition, on the basis of the cylinder identification pulses contained in the output signal from the crank angle sensor 11, the fuel injectors 5a through 5f are controlled to open or start fuel injection at an interrupt timing A during the exhaust strokes of the corresponding cylinders, as clearly shown in FIG. 5.

In Step S14, it is determined whether a correction or adjustment flag is set up, and if not, the control process goes to Step S15 where the amount of change in the engine rpm prior to the correction or adjustment is stored in the RAM 206. In Step S16, correction or adjustment is made to the basic amount of injection fuel for the cylinder which is determined to be misfiring. That is, the amount of fuel to be injected into the doubtful or possible misfiring cylinder is decreased to a predetermined misfire-causing air/fuel ratio K at which misfiring will occur in the cylinder. Subsequently in Step S17, a correction flag is set, and in Step S18, the amount of fuel injection after corrected or adjusted is set into the counter 208, and at the same time, the fuel injector for the cylinder which is in the exhaust stroke is opened or operated to perform fuel injection. Thereafter, a return is carried out to the main routine.

On the other hand, if in Step S9 it is determined that the engine is out of the misfire determination permissible operating condition, or if in Step S11 it is determined that the current cylinder is not the cylinder on which misfire determination is carried out, the control process returns to the main routine via Step S18.

If, however, it is determined in Step S14 that the correction flag is set up, then the control process goes to Step S19 where a check is done whether a difference in the amount of change in the engine rpm before and after the correction or adjustment is greater than a predetermined reference value $\alpha$. If the answer to this question is negative, it is determined that the doubtful misfiring is a true misfire. Thus, in Step S20, an indication of abnormality is made, and the control process returns to the main routine via Steps S16 through S18. If, however, the answer in Step S19 is positive, it is determined that the doubtful misfiring is due to other causes than abnormalities in the fuel supply system, and in Step S22, the correction flag is reset and the control process returns to the main routine via Step S18.

Moreover, if in Step S12 it is determined that the amount of change in the engine rpm is equal to or less than the predetermined reference value, then in Step S21 the indication of abnormality is removed, and in Step S22 the correction flag is reset. The control process then returns to the main routine through Step S18. Although in the above description, the amount of injection fuel for the doubtful or possible misfiring cylinder is decreased to the predetermined misfire-causing air/fuel ratio, the amount of correction $K_M$ can be further changed to such a value as to make the resultant amount of injection fuel to zero. This ensures more accurate misfire determination.

In this manner, according to this embodiment, since the amount of injection fuel for the cylinder in which doubtful or possible misfiring is taking place is decreased to the predetermined misfire-causing value or zero, complete or serious misfiring as well as incomplete or non-serious misfiring can be sensed with improved accuracy, and a misfiring cylinder can also be reliably identified.

Although in the above description, the amount of injection fuel for the doubtful misfiring cylinder is corrected, another type of misfiring determination can be effected. Namely, if it is determined that there is a doubt of misfiring in a cylinder, firing of the spark plug for the doubtful misfiring cylinder is stopped and then a comparison is made between the outputs of the misfire sensing means generated before and after the stoppage of firing. If there is no significant difference in this comparison, it is determined that the doubtful misfiring is a true misfire. In this case, complete misfiring as well as incomplete misfiring due to a failure in the ignition system can be sensed with improved accuracy, and identification of a misfiring cylinder can also be made reliably. Of course, this type of misfire determination can be used in combination with the first-mentioned type of misfiring determination for further improvements in accuracy and reliability.

What is claimed is:

1. A misfire sensing apparatus for an internal combustion engine comprising:

a crank angle sensor for generating an output signal at predetermined crank angles of a crankshaft of said engine;

cylinder identifying means for identifying operating states of a plurality of cylinders of said engine based on the output signal from said crank angle sensor;

adjusting means for adjusting an engine operating parameter so as to control the respective operations of said cylinders;

misfire sensing means for sensing misfire information relating to misfiring in each of said cylinders and determining possible misfiring in a cylinder based on the misfire information, said misfire sensing means being operable such that when there is possible misfiring in a cylinder, it controls said adjusting means so as to adjust said engine operating parameter by a predetermined value, compares misfiring information as sensed before and after the adjustment, and determines an occurrence of true misfiring if a difference in the misfiring information before and after the adjustment is less than a predetermined reference value.

2. A misfiring sensing apparatus according to claim 1, wherein said misfire sensing means successively senses misfire information at the predetermined crank angles of said crankshaft, and determines possible misfiring in a cylinder when a difference between the current misfire information and the previous one is greater than a predetermined level.

3. A misfire sensing apparatus according to claim 2, wherein said misfire information is the number of revolutions per minute of said engine.

4. A misfire sensing apparatus according to claim 1, wherein said adjusting means comprises a plurality of fuel injectors one for each cylinder, and said engine operating parameter is an amount of fuel supplied to each cylinder from a corresponding one of said fuel injectors, said misfire sensing means being operable to decrease, upon occurrence of possible misfiring in a cylinder, an amount of fuel supplied to that cylinder so as to cause intentional misfiring therein.

5. A misfire sensing apparatus according to claim 1, wherein said adjusting means comprises a plurality of spark plugs one for each cylinder, and said engine operating parameter is firing of said spark plugs, said misfire sensing means being operable to stop, upon occurrence of possible misfiring in a cylinder, firing of a spark plug for that cylinder.

* * * * *